United States Patent [19]

Stueben

[11] 4,111,769

[45] Sep. 5, 1978

[54] RADIATION CURABLE PRESSURE SENSITIVE ADHESIVE COMPOSITION

[75] Inventor: Kenneth Charles Stueben, Bridgewater, N.J.

[73] Assignee: Union Carbide Corporation, New York, N.Y.

[21] Appl. No.: 865,630

[22] Filed: Dec. 29, 1977

[51] Int. Cl.² .............................................. C08F 8/00
[52] U.S. Cl. ........................... 204/159.15; 204/159.23; 260/874; 260/901; 427/44; 427/54; 427/207 B; 428/355; 428/425; 428/480
[58] Field of Search .................. 204/159.15; 260/874, 260/901

[56] References Cited

U.S. PATENT DOCUMENTS

| | | | |
|---|---|---|---|
| 3,479,328 | 11/1969 | Nordstrom | 260/86.1 |
| 3,674,838 | 7/1972 | Nordstrom | 260/482 C |
| 3,956,224 | 5/1976 | Chu | 260/33.6 R |

OTHER PUBLICATIONS

Steuben, K. C., "Radiation Curing Pressure Sensitive Adhesives: A/Literature Review", *Adhesives Age*, Jun., 1977, pp. 16-21.

*Primary Examiner*—Richard B. Turer
*Attorney, Agent, or Firm*—Peter R. Shearer

[57] ABSTRACT

Radiation curable pressure sensitive adhesive composition comprises: a polyoxyalkylene homo- or copolymer which is either a polyoxyethylene homopolymer or a poly (oxyethylene - oxypropylene) copolymer, or mixture thereof, having a molecular weight of from 1,700 to 90,000, in which at least 40 percent by weight of the oxyalkylene units are oxyethylene units; a liquid carbamyloxy alkyl acrylate; and, optionally, a photoinitiator.

7 Claims, No Drawings

RADIATION CURABLE PRESSURE SENSITIVE ADHESIVE COMPOSITION

BACKGROUND OF THE INVENTION

In recent years, the increasing desire to reduce pollutants in work environments has prompted adhesives manufacturers to seek elimination of volatile solvents from adhesive compositions. Moreover, elimination of volatile solvents is desirable to reduce energy consumption, since considerable heat energy is required to evaporate volatile solvents when curing the adhesive compositions.

A number of radiation curable adhesive compositions have been developed which are essentially 100 percent reactive. Each component of the composition reacts to become incorporated into the cured adhesive upon exposure to radiation. Thus, the need to evaporate volatile solvents from the composition is eliminated.

A number of pressure sensitive adhesives have been disclosed in the art which are produced by exposing inherently tacky polymers to radiation, thereby increasing their adhesivity (see, e.g., "Radiation Curing of Pressure Sensitive Adhesives: A Literature Review", Stueben, K. C., Adhesives Age, June, 1977).

U.S. Pat. No. 3,661,618 discloses a method of producing a pressure sensitive adhesive which involves applying to a backing material a composition of 100 parts of a liquid alkyl acrylate, 0.01 to 10 parts of a crosslinking agent and from 1 to 50 parts of a polymer capable of increasing the viscosity of the liquid alkyl acrylate, and exposing the composition to high energy particle radiation. As is pointed out in that patent, at Col. 1, line 42 – Col. 2, line 9, the obtainment of pressure sensitive adhesives having good properties by irradiation techniques has proven a most difficult task to those in the art. In order to have substantial commercial utility, the composition, upon irradiation, most develop a reasonably good balance of adhesivity and cohesivity.

Despite the ingenuity displayed by the art, it is always desirable to develop new 100 percent reactive pressure ssnsitive adhesive compositions which display good adhesive properties in the cured state.

SUMMARY OF THE INVENTION

In accordance with the teachings of this invention, a radiation curable pressure sensitive adhesive composition is obtained by the admixture of:
(a) a polyoxyalkylene homo- or copolymer which is either a polyoxyethylene homopolymer or a poly(oxyethylene-oxypropylene) copolymer, or mixture of the two, having a molecular weight of from 1,700 to 90,000, in which at least 40 percent, by weight, of the total oxyalkylene units are oxyethylene units;
(b) a liquid carbamyloxy alkyl acrylate; and, optionally,
(c) a photoinitiator.

The radiation curable pressure sensitive adhesive composition is converted to a pressure sensitive adhesive by applying it as a film to a substrate, such as a backing tape, and exposing it to ionizing or non-ionizing radiation.

It was an unexpected finding that the compositions of this invention cured to produce good pressure sensitive adhesives, in view of the facts that: the polyoxyethylene or poly(oxyethylene-oxypropylene) homo- or copolymers employed have essentially no inherent tackiness; similar compositions containing less than 40 weight percent oxyethylene in the copolymer or in which the copolymer had a molecular weight outside the claimed range did not produce satisfactory pressure sensitive adhesives; and similar compositions, wherein other liquid acrylates were substituted for the carbamyloxy alkyl acrylate, did not produce satisfactory pressure sensitive adhesives.

DETAILED DESCRIPTION OF THE INVENTION

The liquid carbamyloxy alkyl acrylate component of the composition is described by the formula:

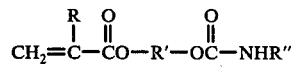

wherein R and R'' are each, individually, hydrogen or alkyl of from 1 to 3 carbon atoms; and R' is alkylene of from 1 to 3 carbon atoms.

The carbamyloxy alkyl acrylates are known compounds and methods of preparing them are disclosed in U.S. Pat. No. 3,674,838. As merely illustrative of suitable carbamyloxy alkyl acrylate compounds within the scope of the formula above, one can mention carbamyloxy methyl acrylate, carbamyloxy methyl methacrylate, N-methyl carbamyloxy methyl acrylate, N-methyl carbamyloxy methyl methacrylate, N-ethyl carbamyloxy methyl acrylate, N-ethyl carbamyloxy methyl methacrylate, 2-(carbamyloxy) ethyl acrylate, 2-(carbamyloxy) ethyl methacrylate, 2-(N-methyl carbamyloxy) ethyl acrylate, 2-N-methyl carbamyloxy) ethyl methacrylate, and the like. The preferred carbamyloxy alkyl acrylate is 2-(N-methyl carbamyloxy) ethyl acrylate.

The liquid carbamyloxy alkyl acrylate is present in the radiation curable pressure sensitive adhesive composition at a concentration of from 35 to 80 weight percent, preferably from 40 to 75 weight percent, based on the total weight of the composition.

The polyoxyalkylene homopolymer or copolymer component of the radiation curable pressure sensitive adhesive composition is characterized by the repeating oxyalkylene units

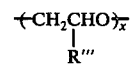

wherein R''' is hydrogen or methyl; x is a number such that the molecular weight of the homopolymer or copolymer is from about 1,700 to 90,000, and preferably is from about 2,500 to 21,000; and the number of R''' substituents which are hydrogen and methyl, respectively, is such that from 40 to 100 percent by weight of the oxyalkylene units are oxyethylene and from 60 to 0 percent by weight of the oxyalkylene units are oxypropylene units. The oxyethylene and, if present, oxypropylene units, can be arranged in block or random sequences.

The polyoxyalkylene homopolymers and copolymers are well known in the art and are prepared by polymerizing ethylene oxide or mixtures thereof with propylene oxide.

The polyoxyalkylene homopolymer or copolymer component is present in the radiation curable pressure sensitive adhesive composition at a concentration of from about 65 to 20 weight percent, preferably from 60 to 25 weight percent, based on the total weight of the composition.

If the composition is to be cured by exposure to non-ionizing radiation, such as ultraviolet radiation, then a photoinitiator is also present in the composition. The photoinitiator, if present, is employed at a concentration of from about 0.1 to 10 weight percent, preferably from 0.5 to 5 weight percent, based on the total weight of the radiation curable pressure sensitive adhesive composition.

The photoinitiators which may be used are well known to those skilled in the art and require no further description for them to know what they are. Nevertheless, one can mention as illustrative of suitable photoinitiators, 2,2-diethoxyacetophenone, 2,2-dimethoxyphenoxyacetophenone, 2- or 3- or 4-bromoacetophenone, 3- or 4-allylacetophenone, 2-acetonaphthone, benzaldehyde, benzoin, the allyl benzoin ethers, benzophenone, benzoquinone, 1-chloroanthraquinone, Michler's Ketone, p-methoxybenzophenone, dibenzosuberone, 4,4-dichlorobenzophenone, 1,3-diphenyl-2-propanone, fluorenone, 1,4-naphthyl-phenylketone, 2,3-pentanedione, propiophenone, chlorothioxanthone, 2-methylthioxanthone xanthone and the like, or any mixtures of these. We prefer to use benzophenone as the photoinitiator. The foregoing list is meant to be illustrative only and is not meant to exclude any suitable photoinitiators known to those skilled in the art.

Those skilled in the art of photochemistry are fully aware that photoactivators can be used in combination with the aforementioned photoinitiators and that synergistic effects are sometimes achieved when such combinations are used. Photoactivators are well known to those skilled in the art and require no further description for them to know what they are. Nonetheless, one can mention as illustrative of suitable photoactivators, methylamine, tributylamine, methyldiethanolamine, 2-aminoethylethanolamine, allylamine, cyclohexylamine, cyclopentadienylamine, diphenylamine, ditolylamine, trixylylamine, tribenzylamine, n-cyclohexylethylenimine, piperidine, N-methylpiperazine, 2,2-dimethyl-1,3-bi -(3-N-morpholinyl) propionyloxy)) propane, and the like.

The liquid carbamyloxy alkyl acrylate, polyoxyalkylene homopolymer or copolymer and, if present, photoinitiator, are blended in any manner suitable for achieving a stable, homogeneous mixture. In some instances, it may be necessary to mix the components at an elevated temperature of about 60° C. or more in order to obtain a homogeneous mixture. When a polyoxyethylene homopolymer was employed as the polyoxyalkylene component, it was found that the presence of a small amount of water, up to about 3 weight percent, based on the total weight of the composition, had a beneficial effect on the obtainment of a stable uniform mixture.

When the foregoing components have been mixed, they can be applied to a substrate by any means suitable for the application of films, such as, for example, reverse roll coating, curtain coating, brushing, or coating with a doctor knife.

The applied composition can be cured by the known radiation curing methods such as by exposure to ultraviolet or electron beam radiation. The cured compositions of this invention exhibit excellent adhesion to a variety of substrates including, but not limited to, steel, aluminum, glass, wood, and thermoset or thermoplastic polymers. Irradiation of the composition can be performed using any of the known and commonly available types of radiation curing equipment. Curing may be carried out in an air atmosphere or in an inert atmosphere such as nitrogen or argon. Exposure time required to cure the composition varies with, inter alia, the particular formulation, type and wavelength of radiation, energy flux, concentration of photoinitiator, film thickness, and nature of the surrounding atmosphere (e.g. air or inert gas such as $N_2$). Those skilled in the art will readily be able to determine the proper curing time for any particular composition. Usually, cure time is rather short, that is, less than about 10 seconds.

In a typical use, the uncured composition of this invention is applied to a polymeric tape substrate, such as polyethylene terephthalate, the composition is radiation cured on the tape, and the tape having the cured composition on its surface is used as a pressure sensitive adhesive tape.

The examples which follow further illustrate the invention described herein and are not intended to limit the invention in any way.

Adhesive properties of the cured compositions of this invention were determined by standard test procedures of the Pressure Sensitive Tape Council. Peel strength was measured by the procedure designated PSTC-1, quick stick by PSTC-5 and shear time by PSTC-7, with the exception that the shear test was modified to use a ½ in. by ½ in. test area, except where otherwise indicated in the examples, and cold rolled steel Q-panels were used in place of chrome plated steel in the peel test.

In the examples, all parts and percents are by weight unless otherwise indicated. The following designations are employed in lieu of the full descriptions for the copolymers used in Example 2.

Copolymer A: Random, linear poly(oxyethylene-oxypropylene) copolymer having a viscosity of 110,000 Saybolt universal seconds in which 75% of the oxyalkylene units are oxyethylene.

Copolymer B: Random, linear poly(oxyethylene-oxypropylene) copolymer having a molecular weight of about 21,000, (viscosity of 380,000 Saybolt universal seconds) in which 75% of oxyalkylene units are oxyethylene. Contains about 25% water in addition to copolymer.

Copolymer C: Random, linear poly(oxyethylene-oxypropylene) copolymer having a molecular weight of about 2,444 (viscosity of 1,400 Saybolt universal seconds), in which 75% of oxyalkylene units are oxyethylene.

The following designations are used in the examples to designate the mode of failure in the peel test.

A = Adhesive failure at polyethylene terephthalate surface.

AM = Adhesive failure at metal surface.

C = Cohesive failure.

MS = Essentially adhesive failure at metal surface with staining of the metal.

Slash (/) indicates mixed mode of failure with the one before the slash predominating.

EXAMPLE 1

Preparation of radiation curable pressure sensitive adhesives based on polyoxyethylene homopolymers A series of four radiation curable pressure sensitive adhesive compositions of this invention, identified as compositions 1–4 in the table below, were produced by admixing polyoxyethylene homopolymers of varying molecular weights with 2-(N-methyl carbamyloxy) ethyl acrylate and benzophenone as a photoinitiator. The benzophenone was employed at a concentration of 2% by weight of total polyoxyethylene homopolymer and 2-(N-methyl carbamyloxy) ethyl acrylate. Compositions 1-3 employed the polyoxyethylene and 2-(N-methyl carbamyloxy) ethyl acrylate in a 25/75 weight ratio, while composition 4 employed them in a ratio of 20 parts polyoxyethylene to 80 parts 2-(N-methyl carbamyloxy) ethyl acrylate. The components were blended at a temperature of 60° C. Wherever necessary, a small amount of water, on the order of about 2.5 weight percent, based on the total composition weight, was added in order to obtain a stable solution which did not precipitate at room temperature.

Each of the compositions was applied to a polyethylene terephthalate tape substrate at a film thickness of about 1-2 mils. Each of the compositions on the substrates was cured by exposure to medium pressure mercury arc lamps, which delivered ultraviolet light at a flux of 500 watts/ft.$^2$, under an air atmosphere.

The cured adhesives on the substrates were tested for peel strength and shear time. Results appear in the table below. The adhesive based on the 90,000 molecular weight poloxyethylene displayed peel strengths which were only marginally acceptable for commercial purposes, yet, useful in certain limited applications.

As a first control, there was prepared a uniform mixture of 50 parts poly(oxyethylene) homopolymer having a molecular weight of 1,000, 50 parts 2-N-(methyl carbamyloxy) ethyl acrylate, and 2 parts benzophenone. The mixture was applied to polyethylene terephthalate and cured in a manner similar to the above compositions. The cured composition exhibited no measurable peel strength at 6 seconds of exposure and 0.02 lb./in. peel strength at 9 seconds of exposure.

As a second control, there was prepared a mixture of 50 parts poly(oxyethylene) homopolymer having a molecular weight of 5,000, 50 parts of 2-ethoxyethyl acrylate, and 2 parts of benzophenone. The mixture was applied to a polyethylene terephthalate tape substrate and cured in a manner similar to the above compositions. No measurable peel strength was obtained after 6 or 9 seconds of exposure to ultraviolet light.

|  | Mol. wt. of | Irradiation | Peel Strength | | |
|---|---|---|---|---|---|
| Composition | polyoxyethylene | time, sec. | lb./in. | failure mode | Shear time |
| 1 | 4,000 | 6 | 1-1.3* | AM/C | 6 min. |
| 1 | 4,000 | 9 | 3.3-4.4* | AM/C | 19 min. |
| 2 | 6,000 | 6 | 1.7 | A | >65 hr. |
| 2 | 6,000 | 9 | 3.5 | A | >50 hr. |
| 3 | 14,000 | 6 | 0.5 | C/AM | 20 sec. |
| 4 | 90,000 | 3 | 0.13 | MS | — |
| 4 | 90,000 | 4 | 0.25 | AM | — |
| 4 | 90,000 | 5 | 0.1 | AM | — |

*repetitive tests

EXAMPLE 2

Preparation of radiation curable pressure sensitive adhesive compositions based on random poly(oxyethylene-oxypropylene) copolymers A series of radiation curable pressure sensitive adhesive compositions were prepared by admixing the components shown in the table below. The amounts shown in the table are in parts by weight. Each of the compositions was applied to a polyethylene terephthalate tape substrate at a film thickness of about 1-2 mils and cured by exposure to medium pressure mercury arc lamps delivering a flux of 500 watts/ft.$^2$ under an air atmosphere. The cured adhesive compositions on the substrates were tested for peel strength and, in some instances, shear time. Results appear in the table below.

When isobornyl acrylate was substituted for the 2-(N-methyl carbamyloxy) ethyl acrylate in composition 3, no measurable peel strength was obtained after 6 and 9 second exposures to the ultraviolet light.

|  | Composition No. | | | | |
|---|---|---|---|---|---|
|  | 1 | 2 | 3 | 4 | 5 |
| Copolymer A | 55 | — | — | — | — |
| Copolymer B | — | 55 | 55* | 45* | 35* |
| Copolymer C | — | — | — | 10 | 20 |
| 2-(N-methyl-carbamyloxy) ethyl acrylate | 45 | 45 | 45 | 45 | 45 |
| Benzophenone | 3 | 3 | 3 | 3 | 3 |

*Indicates copolymer was dried by azeotropic distillation.

| Composition No. | Irradiation time, sec. | Peel strength, lb./in. | failure mode | Shear time |
|---|---|---|---|---|
| 1 | 6 | 0.1 | A | 5 sec. |
| 1 | 9 | 0.1 | A | 2 sec. |
| 2 | 6 | 3.5 | AM | 8.4 hr. |
| 2 | 9 | 2.8 | AM | 31 hr. |
| 3 | 6 | 2.0 | AM | — |
| 3 | 9 | 2.6 | AM | — |
| 4 | 6 | 1.9 | C | — |
| 4 | 9 | 1.9 | AM | — |
| 5 | 6 | 0.8 | MS/C | — |
| 5 | 9 | 1.8 | AM/C | — |

EXAMPLE 3

Preparation of radiation curable pressure sensitive adhesive compositions based on block type poly(oxyethylene-oxypropylene) copolymers A series of compositions were prepared which incorporated poly(oxyethylene-oxypropylene) block copolymers of varying molecular weights and oxyethylene contents. The block copolymers, identified as Nos. 1-7, are characterized in the table below with respect to their molecular weights, oxyethylene (OE) contents, and average oxyethylene (OE) and oxyproplyene (OP) block lengths.

| Block Copolymer No. | 1 | 2 | 3 | 4 | 5 | 6 | 7 |
|---|---|---|---|---|---|---|---|
| Molecular weight | 1403 | 1783 | 2568 | 1926 | 1941 | 2511 | 3411 |
| OE content, weight % | 20 | 40 | 60 | 17 | 20 | 40 | 60 |
| OE block length, units | 6.4 | 16.2 | 35 | 7.4 | 8.8 | 22.8 | 46.5 |
| OP block length, units | 18.1 | 18.9 | 6.1 | 26.3 | 25.5 | 24.8 | 22.2 |

The compositions were prepared by admixing, 55 parts of the block copolymer, 45 parts of 2-(N-methyl carbamyloxy) ethyl acrylate, and 3 parts of benzophenone as a photoinitiator.

The compositions were applied to polyethylene terephthalate tape substrates at film thicknesses of about 1–2 mils. The applied compositions on the substrates were cured by 8 seconds of exposure to a medium pressure mercury arc lamp which delivered a flux of 500 watts/ft.$^2$ under an air atmosphere. The cured compositions on the substrates were tested for peel strength and, in some instances, shear time. Results appear in the table below. It can be seen that only the compositions containing copolymers having molecular weights of at least 1700 and EO contents of at least 40 weight percent developed any measurable peel strength.

| Block Copolymer No. | Peel strength, lb./in. | failure mode | Shear time |
|---|---|---|---|
| 1 | 0 | MS | — |
| 2 | 0.35 | C | — |
| 3 | 0.75 | C | — |
| 4 | 0 | MS | — |
| 5 | 0 | MS | — |
| 6 | 1.2 | C/AM | 1 min. |
| 7 | 1.4 | AM/C | 3.5 hr. |

The cured compositions containing Block Copolymers No. 6 and 7 had measured quick stick (according to PSTC - 5) of 0.2 lb. and 0.1 lb., respectively.

COMPARATIVE EXAMPLES

As comparative examples, there were prepared a series of compositions based on poly(oxypropylene) homopolymers and poly(tetramethylene oxide) homopolymers. The poly(oxypropylene) and poly(tetramethylene oxide) polymers employed had molecular weights in the range of molecular weights of the poly(oxyalkylene) homo- and copolymers used in this invention. Moreover, they were employed in the compositions at concentrations within the range of concentrations of poly(oxyalkylene) polymers in the compositions of this invention. The compositions were applied to polyethylene terephthalate tapes and cured in a manner similar to that of Example 1. The cured compositions were tested for peel strength and the results are given in the table below. In the table, the polymers used are identified as follows:
I = poly(oxypropylene), molecular weight 6,013
II = poly(oxypropylene), molecular weight 3,000
III = poly(tetramethylene oxide), molecular weight 2,000

It can be seen that little or no peel strength was developed in most instances. Thus, it was a quite unexpected finding that the poly(oxyethylene) and poly(oxyethylene-oxypropylene) based compositions of this invention developed the peel strengths illustrated in the previous examples.

| Polymer | Composition,$^1$ p.b.w. | Cure time, sec. | Peel strength lb./in. | failure mode |
|---|---|---|---|---|
| I | 30/70/2 | 9 | 0 | C (wet)$^2$ |
| I | 55/45/3 | 6 & 9 | 0.05 | C |
| II | 55/45/3 | 9 | 0.05 | C |

-continued

| Polymer | Composition,$^1$ p.b.w. | Cure time, sec. | Peel strength lb./in. | failure mode |
|---|---|---|---|---|
| II | 50/50/2 | 6 & 9 | 0 | sl.c$^3$ |
| III | 55/45/3 | 9 | 0 | wet |
| III | 30/70/3 | 6 | 0.2 | C |
| III | 30/70/3 | 9 | 0.4 | AM/MS |

$^1$Indicates polymer/2-N-(methyl carbamyloxy)ethyl acrylate/benzophenone
$^2$"Wet" indicates partially or completely uncured to solid state.
$^3$Primarily adhesive at metal, slightly cohesive.

What is claimed is:

1. A radiation curable pressure sensitive adhesive composition comprising:
  (A) from 35 to 80 weight percent of a liquid carbamyloxy alkyl acrylate of the formula:

wherein R and R" are each, individually, hydrogen or alkyl from 1 to 3 carbon atoms, R' is alkylene of 1 to 3 carbon atoms;
  (B) from 20 to 65 weight percent of a polyoxyalkylene homopolymer or copolymer which is characterized by the repeating units:

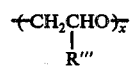

wherein each R''' is hydrogen or methyl and a sufficient number of the R''' substituents are hydrogen that from 40 to 100 percent by weight of the oxyalkylene units in the polymer are oxyethylene units and from 60 to 0 percent by weight are oxypropylene units; and $x$ is a number such that the molecular weight of the polyoxyalkylene homopolymer or copolymer is from 1,700 to 90,000; and
  (C) from 0.1 to 10 weight percent of a photoinitiator.

2. Radiation curable pressure sensitive adhesive composition as claimed in claim 1, wherein said component (A) is present at a concentration of from 40 to 75 weight percent and said component (B) is present at a concentration of from 25 to 60 weight percent.

3. A radiation curable pressure sensitive adhesive composition as claimed in claim 1, wherein said component (C) is present at a concentration of from 0.5 to 5 weight percent.

4. A radiation curable pressure sensitive adhesive composition as claimed in claim 1, wherein said liquid carbamyloxy alkyl acrylate is 2-(N-methyl carbamyloxy) ethyl acrylate.

5. A radiation curable pressure sensitive adhesive composition as claimed in claim 1, wherein $x$ has a value such that the molecular weight of said polyoxyalkylene homopolymer or copolymer is from 2,500 to 21,000.

6. A radiation curable pressure sensitive adhesive composition as claimed in claim 4, wherein said polyoxyalkylene homopolymer or copolymer is a polyoxyethylene homopolymer.

7. A radiation curable pressure sensitive adhesive composition as claimed in claim 4, wherein said polyoxyalkylene homopolymer or copolymer is a poly(oxyethylene-oxypropylene) copolymer.

* * * * *